Dec. 16, 1930.   A. ROSMAN   1,784,975
VEHICLE BODY
Filed April 19, 1929   13 Sheets-Sheet 1
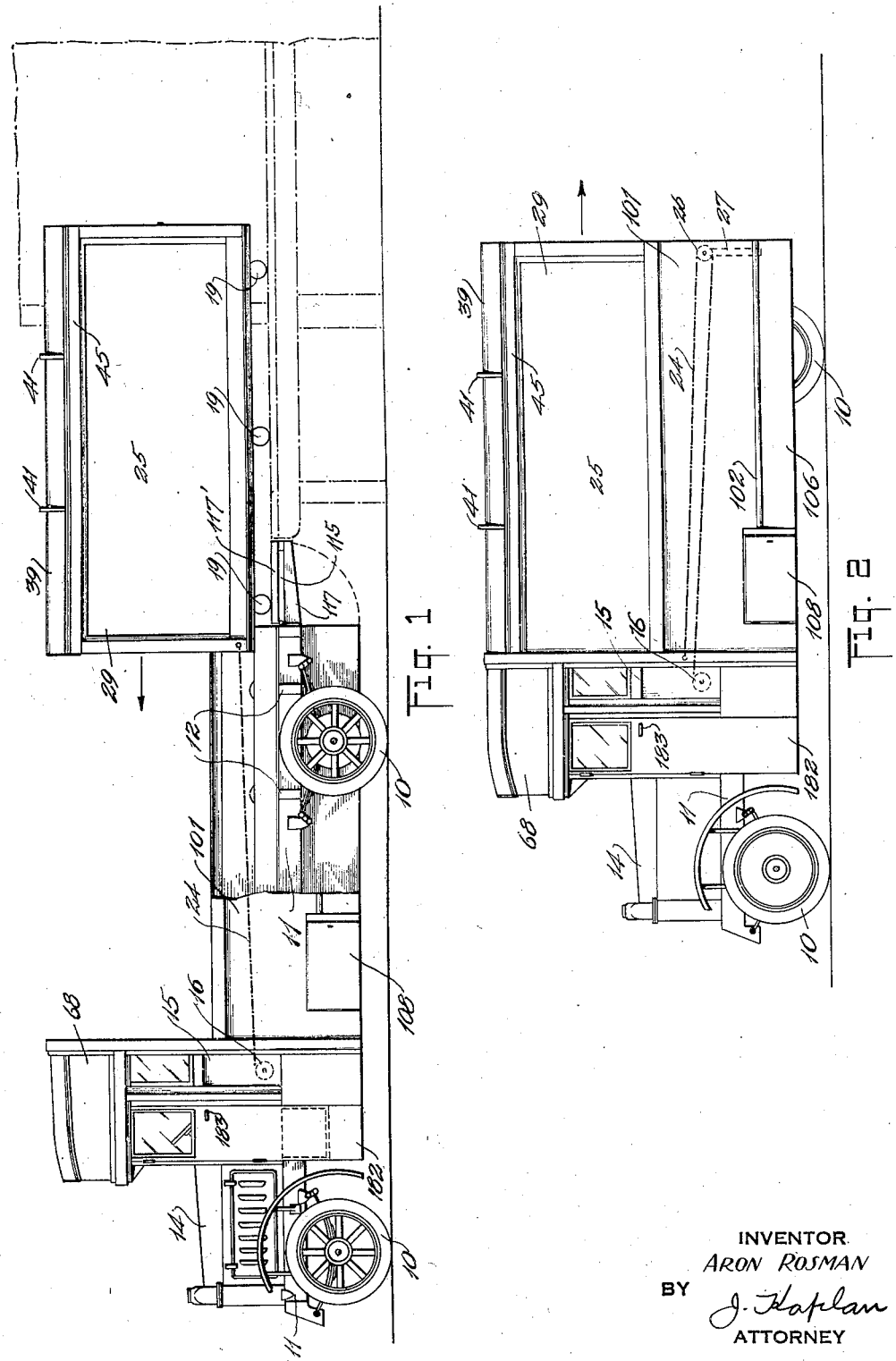
INVENTOR
ARON ROSMAN
BY J. Kaplan
ATTORNEY

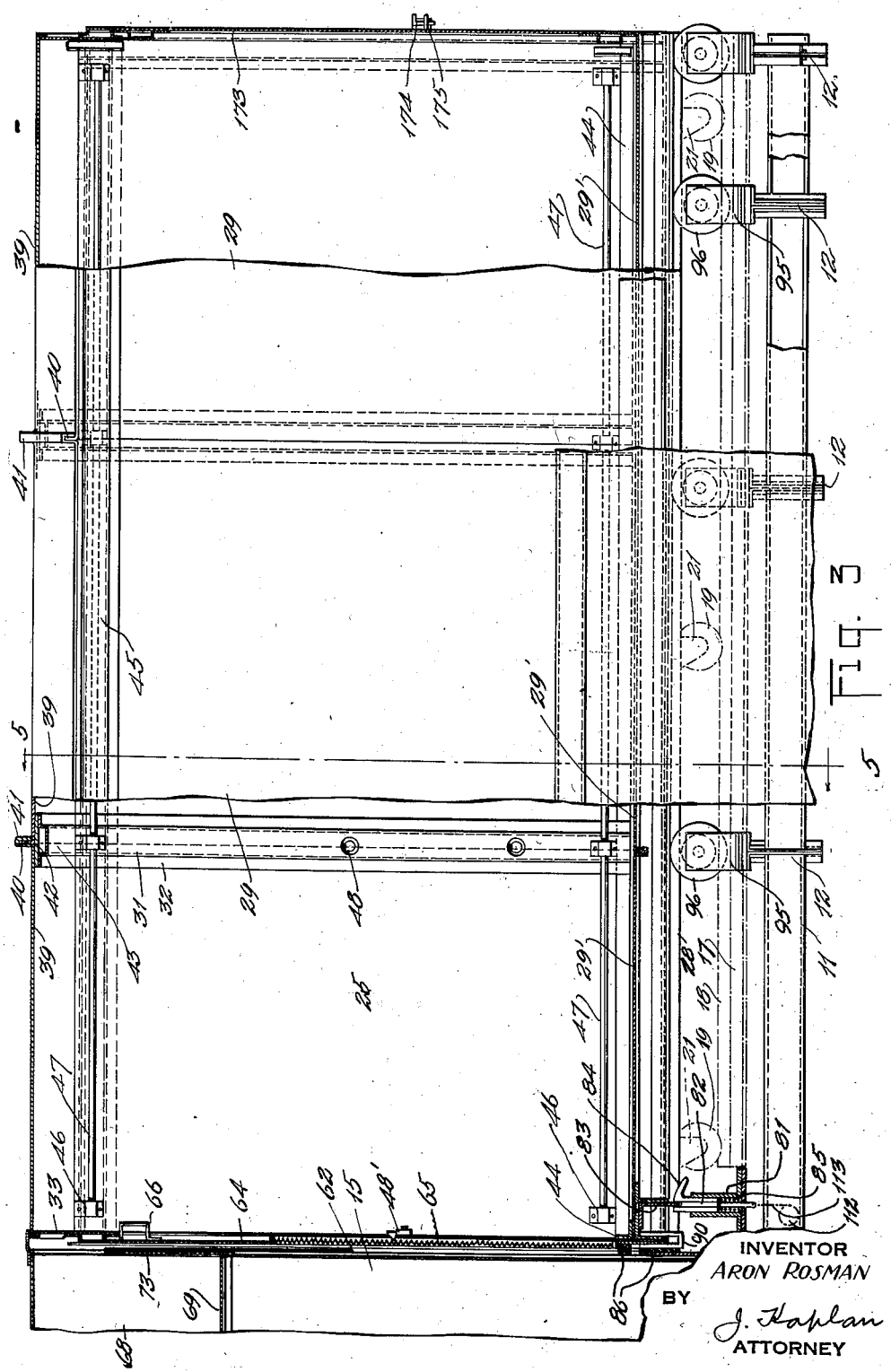

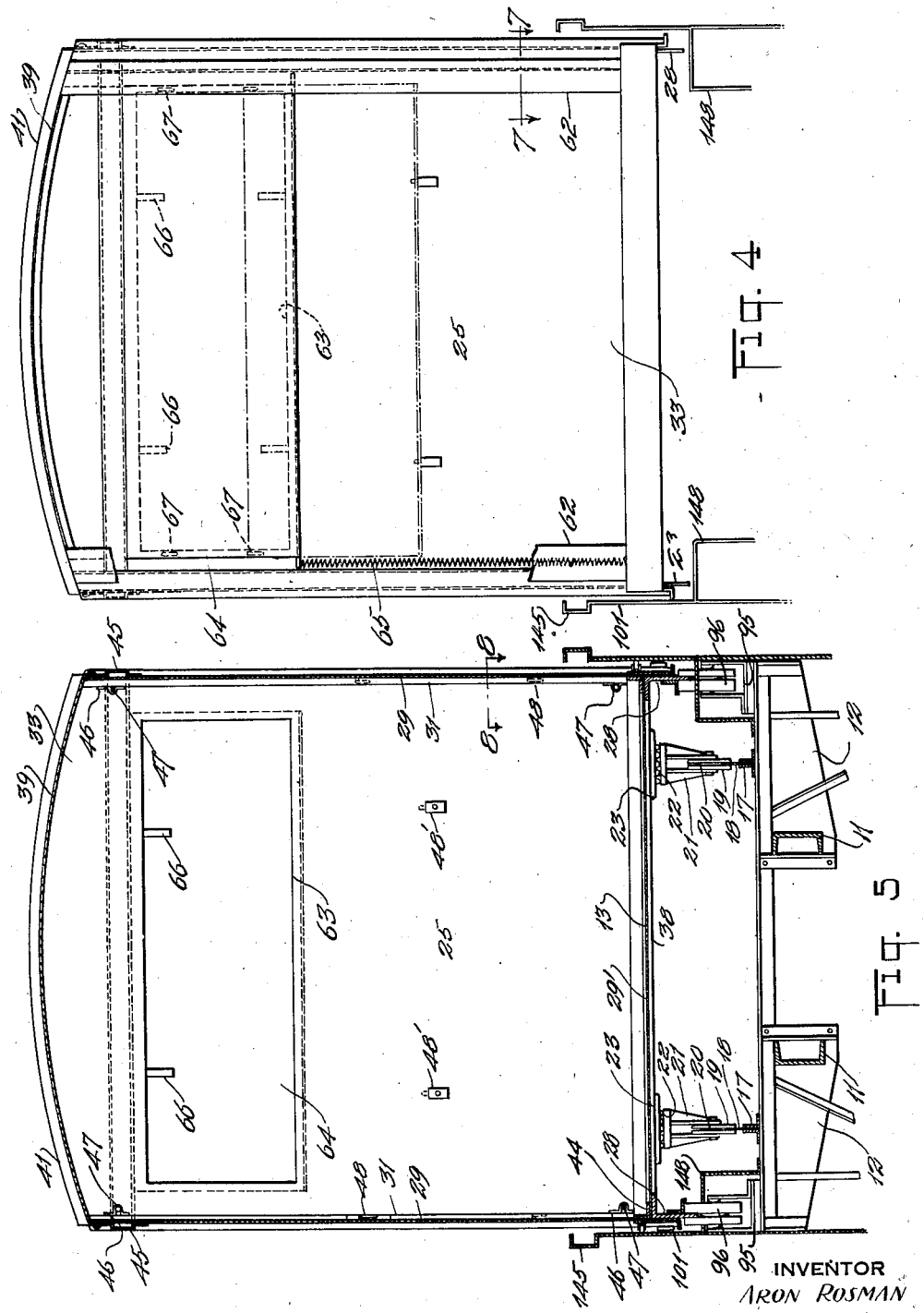

Dec. 16, 1930.  A. ROSMAN  1,784,975
VEHICLE BODY
Filed April 19, 1929   13 Sheets-Sheet 4
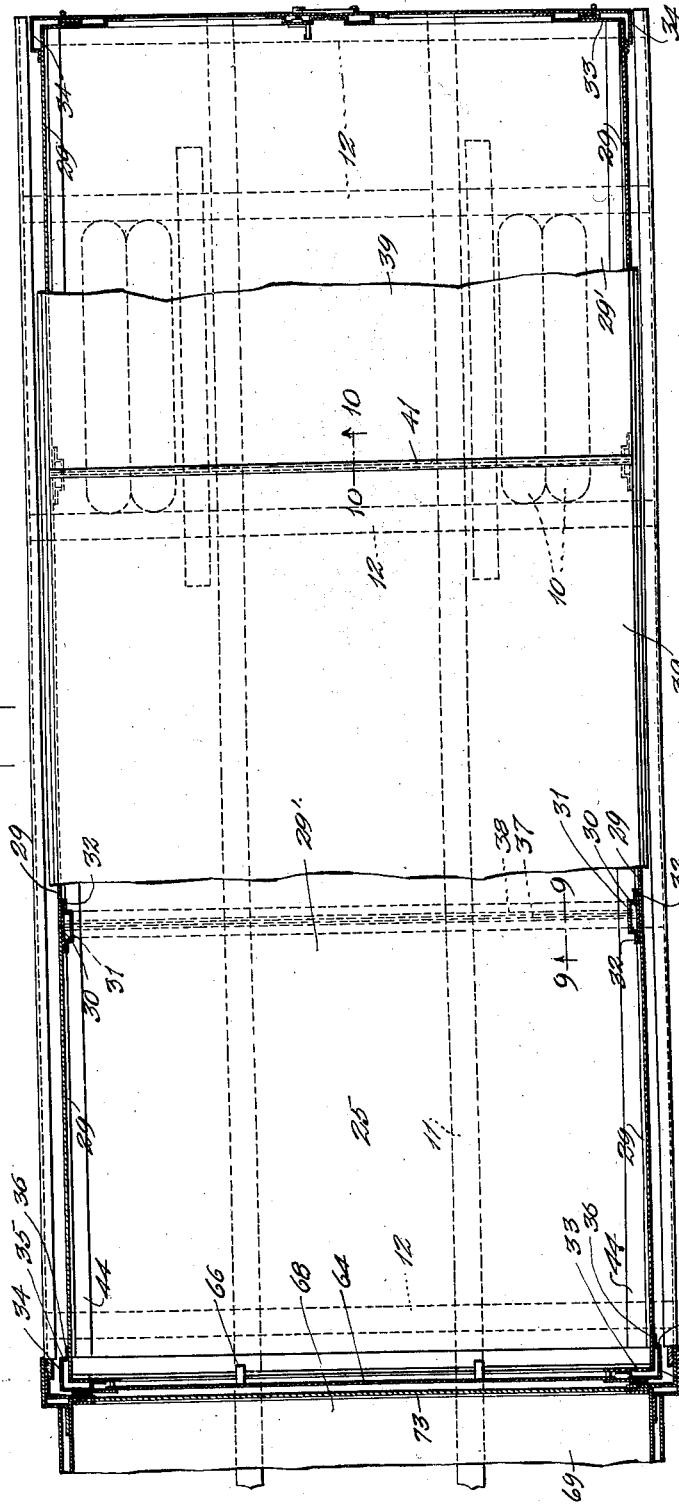
INVENTOR
ARON ROSMAN
BY
J. Kaplan
ATTORNEY Dec. 16, 1930.                A. ROSMAN                 1,784,975
                              VEHICLE BODY
                        Filed April 19, 1929        13 Sheets-Sheet 5
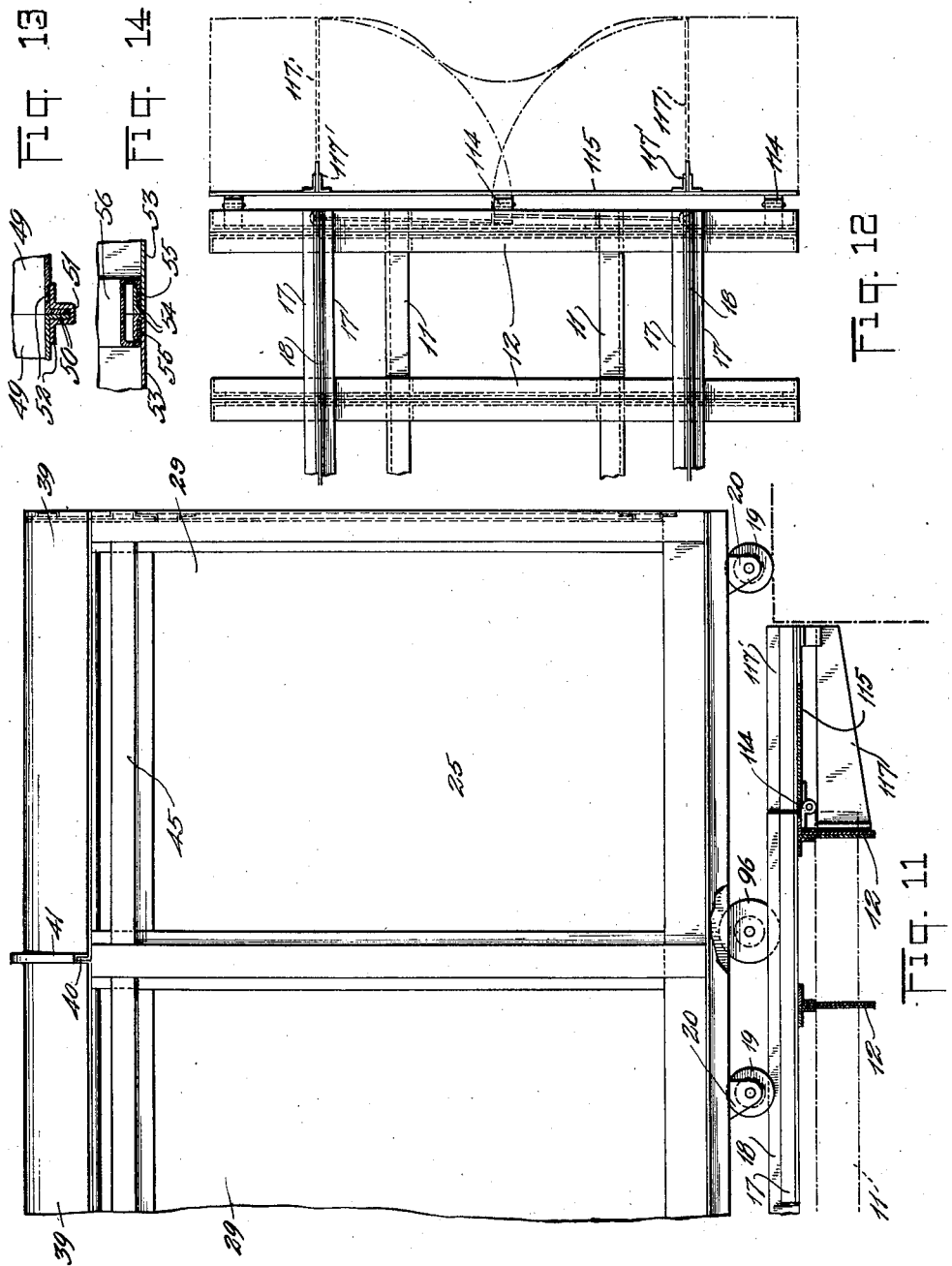
INVENTOR
ARON ROSMAN
BY
*J. Kaplan*
ATTORNEY Dec. 16, 1930.                A. ROSMAN                1,784,975
                              VEHICLE BODY
                       Filed April 19, 1929    13 Sheets-Sheet 6
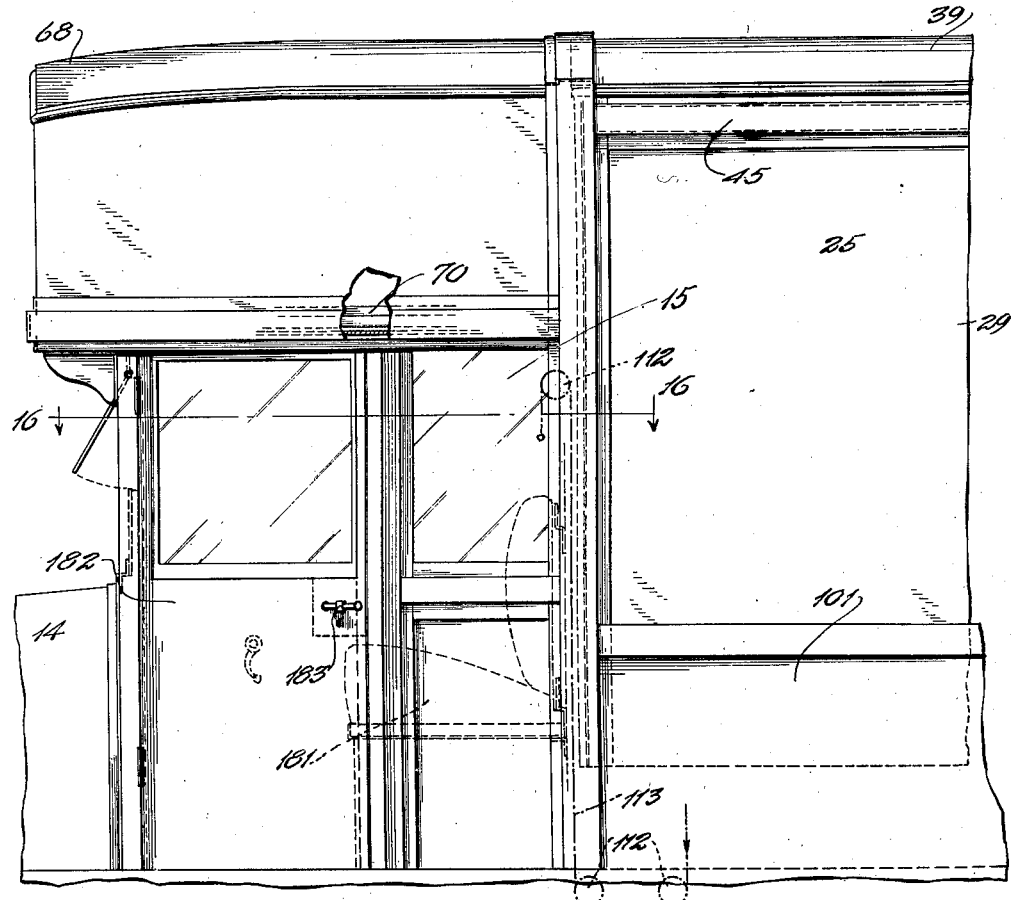
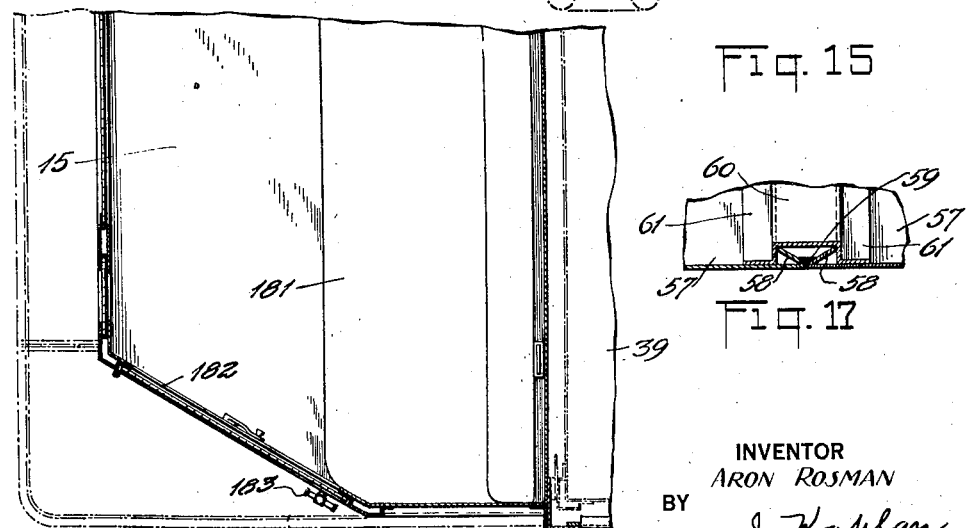
Fig. 15
Fig. 17
Fig. 16
INVENTOR
ARON ROSMAN
BY
*J. Kaplan*
ATTORNEY

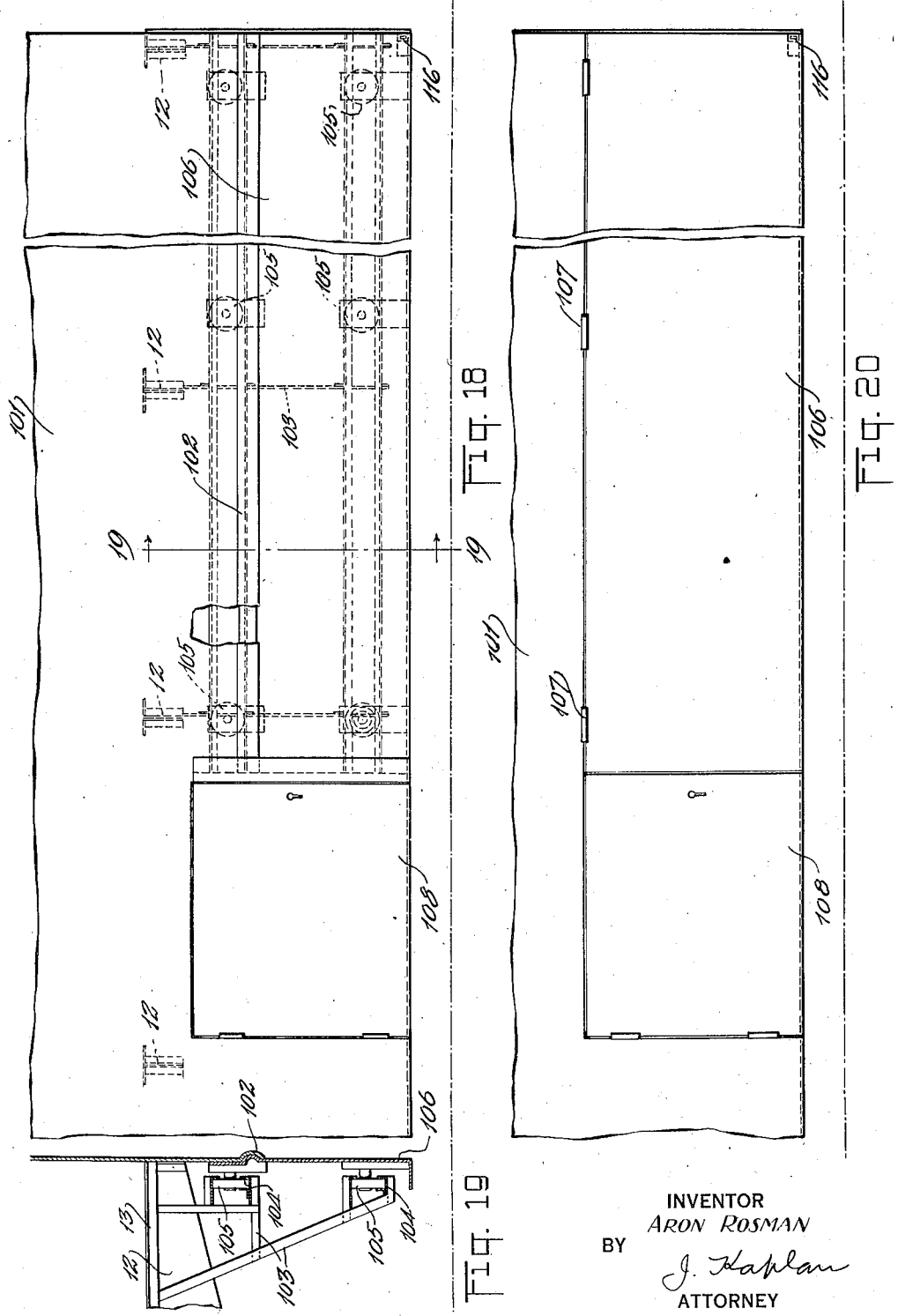

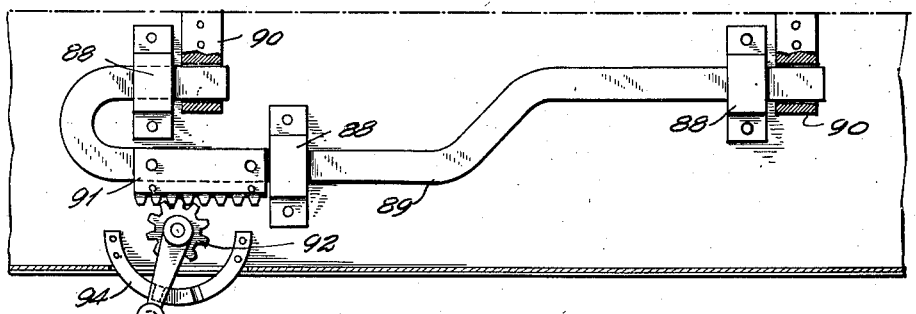
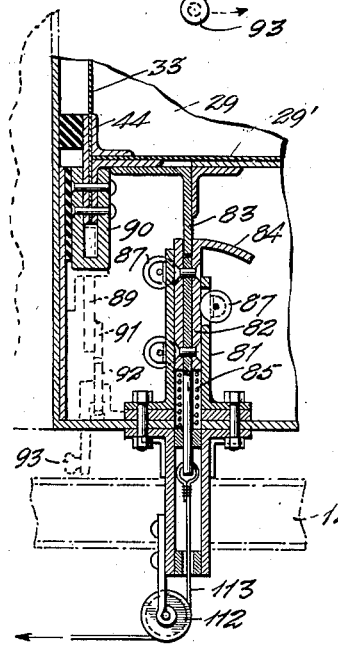
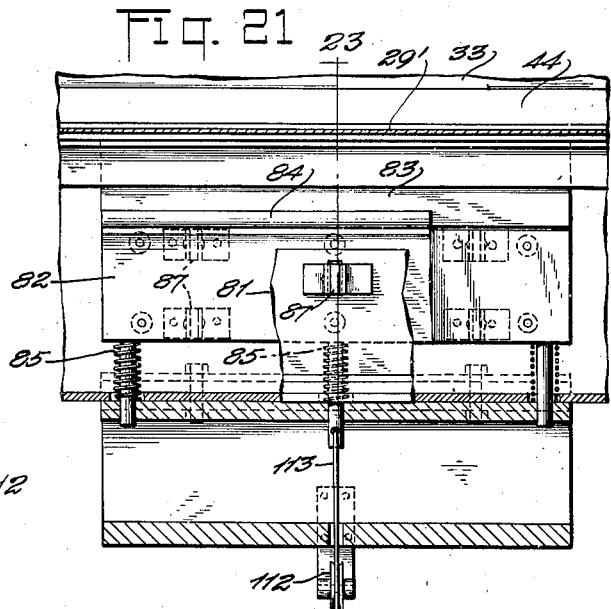
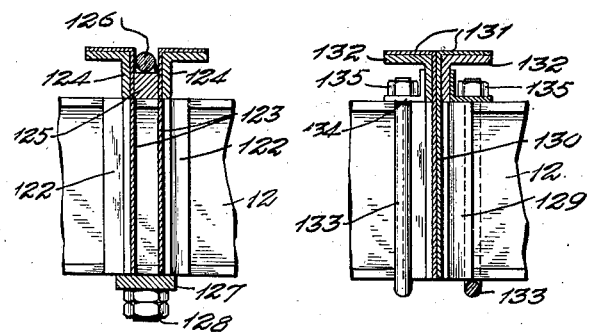
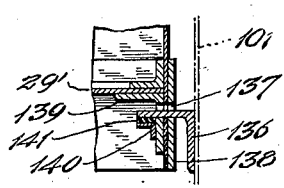

Dec. 16, 1930.  A. ROSMAN  1,784,975
VEHICLE BODY
Filed April 19, 1929  13 Sheets-Sheet 9

INVENTOR
ARON ROSMAN
BY
J. Kaplan
ATTORNEY

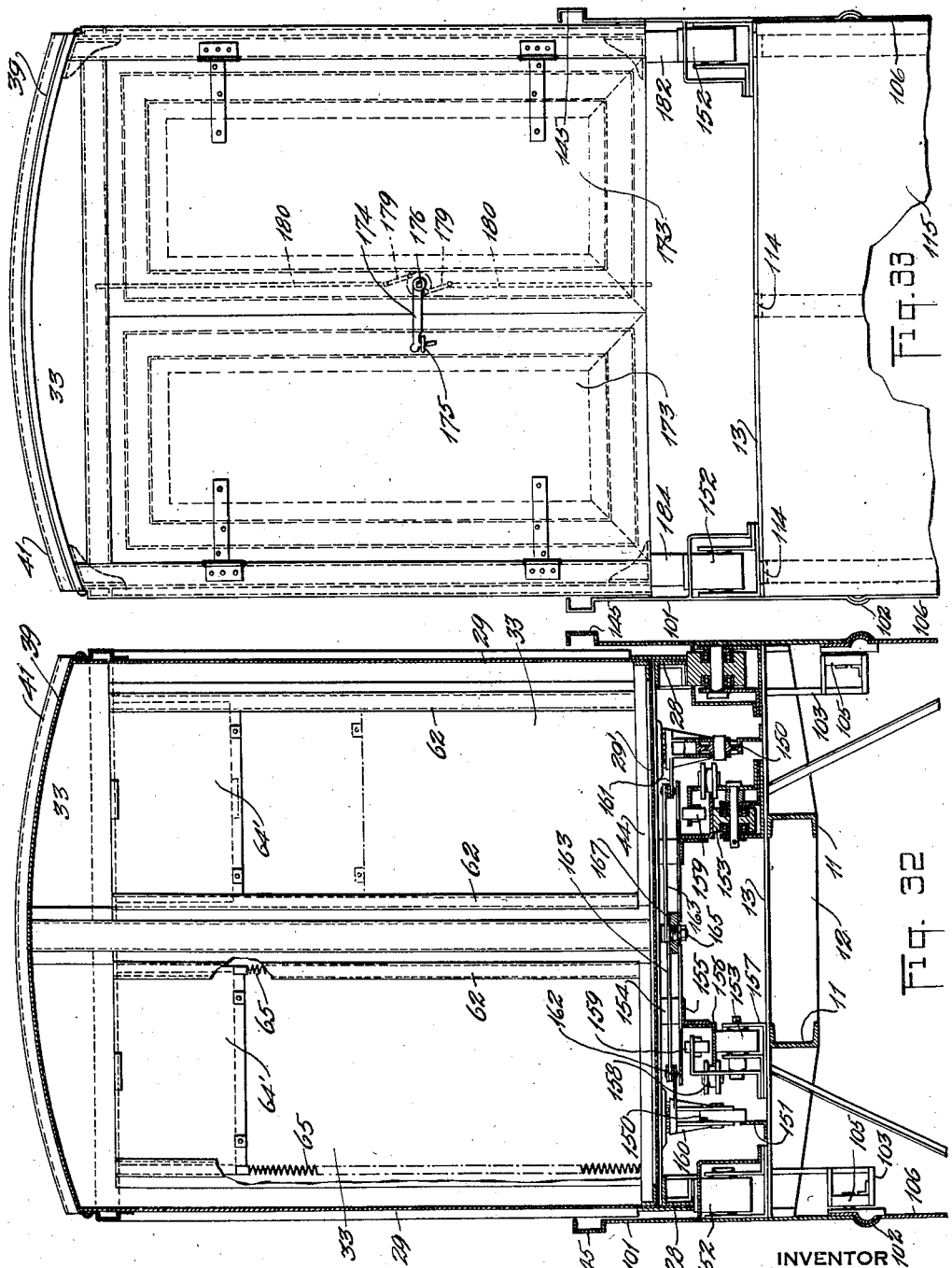

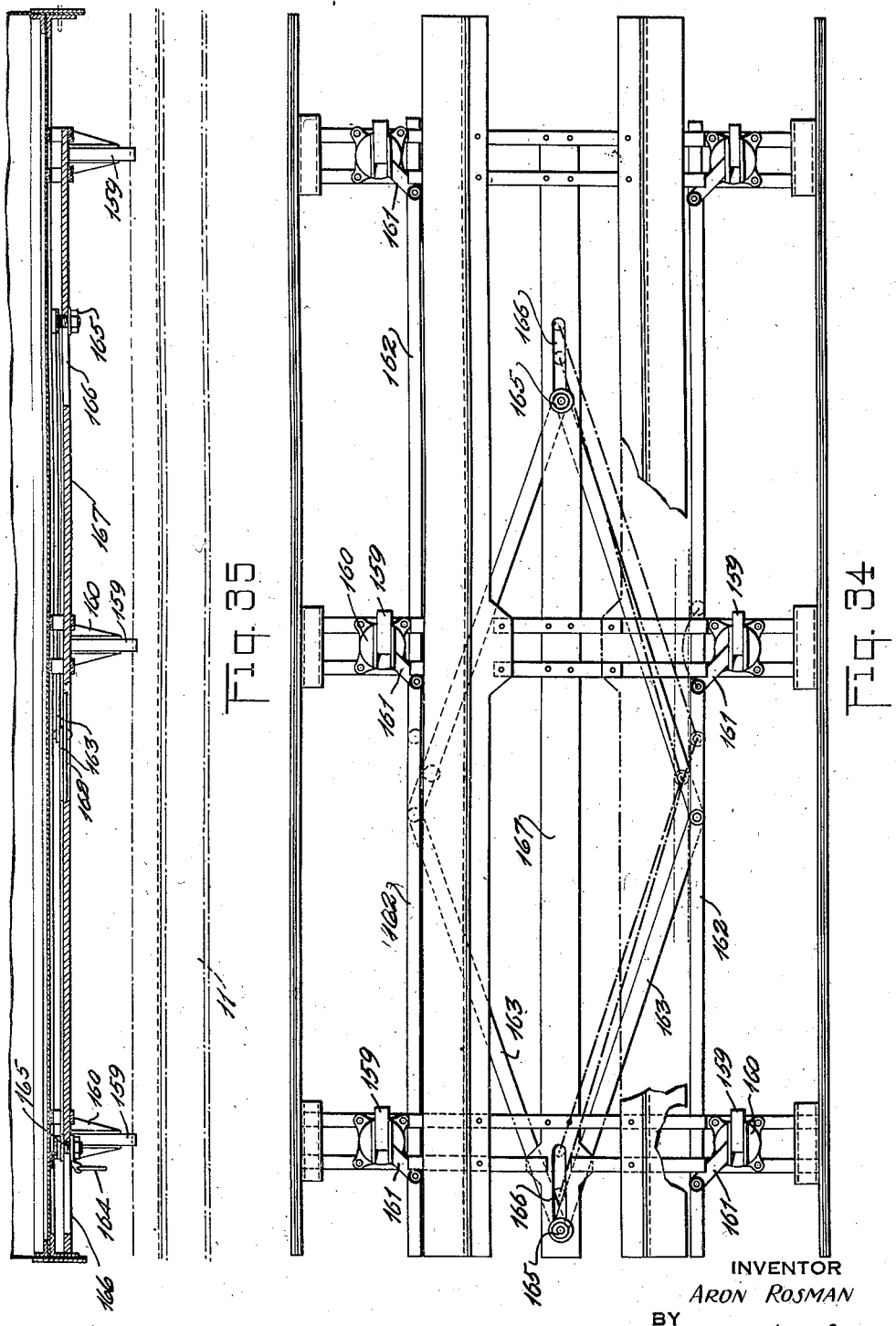

Dec. 16, 1930.  A. ROSMAN  1,784,975
VEHICLE BODY
Filed April 19, 1929   13 Sheets-Sheet 12
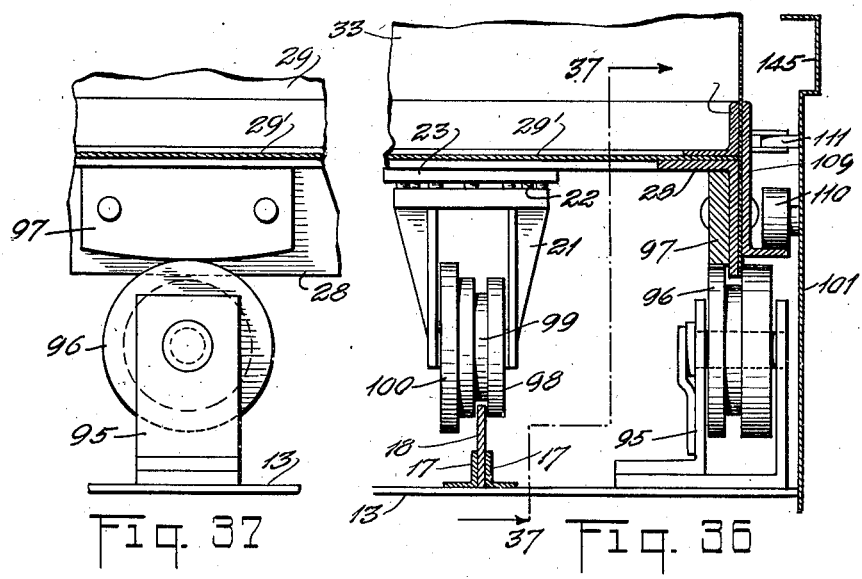
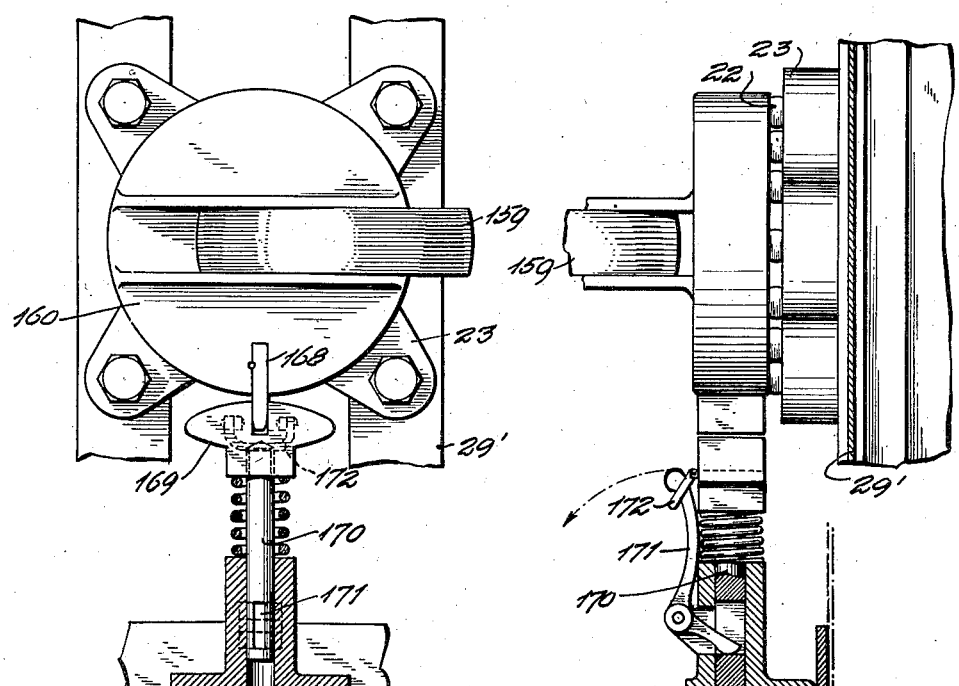
INVENTOR
ARON ROSMAN
BY J. Kaplan
ATTORNEY Dec. 16, 1930.  A. ROSMAN  1,784,975
VEHICLE BODY
Filed April 19, 1929  13 Sheets-Sheet 13

INVENTOR
ARON ROSMAN
BY
J. Kaplan
ATTORNEY

Patented Dec. 16, 1930

1,784,975

UNITED STATES PATENT OFFICE

ARON ROSMAN, OF BROOKLYN, NEW YORK

VEHICLE BODY

Application filed April 19, 1929. Serial No. 356,526.

This invention relates to trucks of the type frequently used in transporting goods such as furniture and the like and for transporting goods on interurban routes.

Such trucks are commonly provided with closed bodies called van bodies or vans and the invention particularly relates to trucks having detachable bodies, such bodies being either van bodies or of any other desired type.

Among the many advantages attained by the use of trucks with detachable bodies it may be noted that, with such bodies properly arranged so as to be easily removed from or placed on the truck chassis, a single chassis may be used with several bodies, the bodies being packed and unpacked while removed from the chassis so that the latter can be transporting one load while another is being stored in a detached body and a third is being unpacked from its body. Thus the chassis may be kept almost constantly in service between two or more points or stations, its travel service being interrupted at the stations only long enough to remove one body as a unit and load a second body on to the chassis.

Thus the long delays in loading and unloading necessary with trucks having permanently attached bodies are eliminated and the number of chassis necessary to accomplish a given ton-mile movement is kept to a minimum.

In order to attain this result it is necessary that the bodies be readily moved on and off the chassis and one important object of the present invention is to provide a novel construction of chassis and body by means of which the body may be removed from or loaded on the chassis in a simple and expeditious manner and without too great an expenditure of power.

Also, it is advisable that such removal and replacement should be effected by the power used to drive the truck chassis, that is, its engine, so that it is not necessary to provide power plants at the loading and unloading stations. A second important object of the invention is, therefore, to provide an improved detachable body truck wherein the truck body is arranged for removal from and loading on the chassis by power derived from the truck engine.

Naturally less power is required to move the body on and off the chassis if such a body is supported on wheels or rollers but the shocks incident to road travel tends to injure the wheels or rollers as it is not practicable to support the weight of the body by springs interposed between the body and the chassis floor or frame. A third important object of the invention is to eliminate injurious shocks to the wheels or rollers in such a construction by providing improved means whereby the weight of the body may be raised off the wheels or rollers, upon which it is moved, after it is in position on the chassis.

The body, during travel, cannot be depended upon to stay in place on the chassis if left free to move with respect thereto and a fourth important object of the invention is to provide improved means for securing the body to the chassis in such manner that it cannot be displaced by any of the ordinary shocks and jars of road travel, it being also part of this object of the invention to have the securing means under the control of the driver.

I have found that it is inadvisable to roll the body onto an ordinary flat floor as, with such an arrangement, not only is it difficult to keep the flooring from rapid wear but it is also difficult to properly position the body on the chassis. A fifth object of the invention is to provide a novel track arrangement on the chassis arranged to cooperate with an improved wheel arrangement beneath the body, the wheels being grooved to straddle the track. Furthermore, it is part of this object of the invention to provide a construction of wheel arrangement beneath the body such that the wheels may run on a narrow plate set edgewise on the chassis, or on ordinary track rails such as may be provided at some stations, or on a flat floor such as may be found at places unprovided with rails as, for instance, a place not usually used for loading or unloading.

It sometimes happens that a truck cannot be backed into position so that the tracks on the truck can closely join tracks at a station and a sixth object of this invention is to provide an improved construction of chassis having means at its rear end by which an extension of the tracks on the chassis may be effected.

A seventh object of the invention is to provide means adapted for use in case the floor at platform is above or below the level of the rails on the chassis, such means being provided with a novel track arrangement.

In some instances it may be desirable to move a body at a station laterally to bring it into proper alinement with the tracks on the chassis or to shift it out of such alinement to permit a second body being alined with the rails. An eighth object of the invention is to provide an improved wheel arrangement beneath the body and to provide means whereby the wheels may be simultaneously turned between positions for permitting longitudinal movement of the body to positions for permitting lateral movement thereof, the wheels being normally secured in the first of said positions.

A ninth object of the invention is the provision of a novel arrangement of safe compartment in such a truck, the compartment being so arranged that receptacles containing valuables may be rolled therein and latch means releasable only from within the driver's cab being employed to hold the receptacles against unauthorized removal.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side view of the invention showing the body being moved onto the truck various details being omitted.

Figure 2 is a view similar to Figure 1 showing the arrangement for moving the body off the truck proper.

Figure 3 is a side view partly in section of a van body used herewith, the view also showing certain parts of the chassis or truck proper.

Figure 4 is a view showing the front end of the van body, the view being partly broken away.

Figure 5 is a section on the line 5—5 of Figure 3.

Figure 6 is a plan view partly in section, of the van body, the view also showing a small portion of the safe compartment above the cab in section.

Figure 7 is an enlarged detail section on the line 7—7 of Figure 4.

Figure 8 is an enlarged detail section on the line 8—8 of Figure 5.

Figure 9 is an enlarged detail section on the line 9—9 of Figure 6.

Figure 10 is an enlarged detail section on the line 10—10 of Figure 6.

Figure 11 is a detail side view, partly in section, showing the track extension arrangement.

Figure 12 is a plan view of a portion of the rear end of the truck proper or chassis showing the track extension arrangement.

Figure 13 is a section showing a modification of the joint disclosed in Figure 9.

Figure 14 is a section showing a modification of the joint disclosed in Figure 8.

Figure 15 is a side view of the cab and safe compartment, the latter being partly broken away and the view also showing the forward end of the van body.

Figure 16 is a section on the line 16—16 of Figure 15.

Figure 17 is a section through a joint adapted to be used in place of any of the joints shown in Figures 8, 9, 10, 13 and 14.

Figure 18 is a side view of a wheel housing and tool box arrangement for use herewith.

Figure 19 is a section on the line 19—19 of Figure 18.

Figure 20 is a view similar to Figure 18 but showing a modification thereof.

Figure 21 is a rear elevation of a certain manually operable latching means used therewith.

Figure 22 is a rear elevation, with certain parts in section and certain other parts broken away, of an automatic latching means used herewith.

Figure 23 is a section on the line 23—23 of Figure 22 and showing both latching means.

Figure 24 is a section showing a means of attaching the platform to the chassis frame.

Figure 25 is a section showing a modification of the construction shown in Figure 24.

Figure 26 is a section showing certain anti-rattling means used herewith.

Figure 32 is a view similar to Figure 5 but showing a modification of the construction there disclosed.

Figure 33 is a rear view similar to Figure 4 but showing the modification of Figure 32.

Figure 34 is a bottom view of the device used for simultaneously changing the positions of the body supporting wheels between two positions at right angles to each other.

Figure 35 is a side elevation, partly in section, of the mechanism shown in Figure 34, the wheels being shown at right angles to the position of Figure 34.

Figure 36 is an enlarged detail cross section showing the track wheels and lifting wheels, the body being shown raised.

Figure 37 is a section on the line 37—37 of Figure 36.

Figure 38 is a bottom plan view, partly in section, showing certain latch means adapted to be used in connection with the mechanism shown in Figures 34 and 35.

Figure 39 is a view of the parts shown in Figure 38 at right angles thereto, the view being also partly in section.

Figure 27:
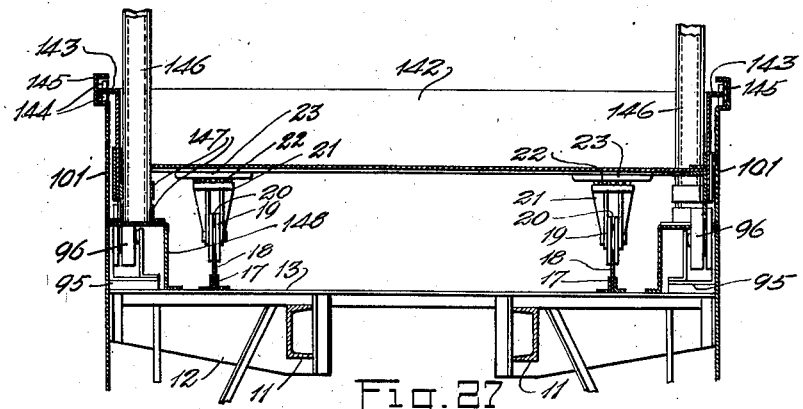
Figure 27 is a transverse section through a portion of the chassis showing a modified platform arrangement adapted for use with an open body.

In the invention as herein shown and described, the construction disclosed shows a convertible truck body; the same divided into two main parts; first, a special platform with chauffeur's cab, side and rear covering of lower chassis, safe box with receptacles, tool box and loading device with means for attaching the second part, the body; the body being one or a number of vans, open platforms or any other kind for any special purpose in rigid or collapsible construction. 10 represents wheels, and 11 the longitudinal frame of the chassis. These longitudinal frame members carry transverse or cross members 12 which project laterally beyond the longitudinal frame members in the usual manner. In order to eliminate weight a floor is omitted. Forwardly the truck is provided with the usual hood 14 housing the engine, not shown, and just to the rear of the hood there is located the driver's cab 15. Mounted in the cab is a winding drum 16 suitably connected to the engine in any well known manner so that the drum may be driven thereby. It is not deemed necessary to show the manner of connecting this drum to the engine because such connection is well known in the art and forms no part of the present invention. Mounted longitudinally on cross members 12 are tracks, at present made of pairs of angle irons 17 supporting upright plates 18. On these rails run wheels 19 each having a groove 20 so that the wheels straddle the rails and these wheels are journaled in the lower ends of standards 21 swiveled on ball bearings 22 to base plates 23 whereon is supported the removable body of the vehicle. The construction of this body in detail will be presently described but at the present time it is merely necessary to note that around the drum 16 is wound a cable or chain 24 which may be connected to the front end of the body 25 as in Figure 1 to draw the body onto the truck or which may pass around an idler pulley 26 at the rear of the chassis, the pulley being supported either on the rear member 12 or platform of warehouse or on a suitable bracket 27 as in Figure 2, this figure showing the arrangement of the parts for pulling the body off of the truck. At each lower longitudinal corner of the body there is provided an angle iron 28 and the sides of the body are formed of metal plates 29 which, as shown in Figure 8, butt together edge to edge. The joint between adjacent side plates is covered on the inside with a cover plate 30 secured in any suitable manner to the side plates and on the inside of this plate 30 is a brace plate which consists of a central channel portion 31 having out turned feet 32 which rest on the respective plate 30, the channel being likewise firmly secured by any suitable means to the plate 30. Thus the sides of the van body here shown are firmly secured together. At each vertical end corner the respective plate 29 is connected to an end plate 33, a corner brace plate such as is shown in Figure 7 being used at each corner. This corner brace plate consists of a strip of metal bent longitudinally to form an angle member 34 and from the edges of this angled member extend legs 35 terminating in feet 36 which rest respectively against the side plate 29 and the end plate 33. The floor 13 is also built up of several plates and one meeting edge of each of these plates is bent downwardly to form a flange 37, as shown in Figure 9. The adjacent plate has its edge bent downwardly and then upwardly to form a channel 38 into which the flange fits so that these floor plates are also firmly secured together. The top or roof consists of arch plates 39, the meeting edges of these arch plates being provided respectively with an up turned flange 40 so that these plates are connected in a manner similar to the floor plates. Within the body the joint thus formed is covered by a cover plate 42 which is reinforced by a channel member 43 substantially the same as the channel member 31 and the cover plate 30, the roof details being well shown in Figure 10. Within the body at the bottom is a reinforcing angle 44 while at the top on the outside of the body there are provided the longitudinally extending reinforcing channels 45, similar to the channels 31 and 43 as can be seen by reference to Figure 5. Within the body at the upper part of each side are brackets 46 which support rods 47 on which articles may be hung or to which padding may be secured to prevent contact of the van contents with the metal work of the sides. Also hooks 48 or other suitable means may be secured where desired on the inside for the engagement of articles under transportation or for the attachment of ropes, straps and the like to hold articles in position.

Modifications of the joint construction, suitable for any of the joints between the side, bottom and top plates are disclosed in Figures 13, 14 and 17. In Figure 13 there is shown two plates 49 which may be any of the plates mentioned and these plates have their meeting edges turned down to provide flanges 50 over which fits a channel member 51 having feet 52 suitably secured to the plates 49. Again, in Figure 14 the plates 53 have their meeting edges bent backwardly on themselves to form channel portions 54 into which fit the inturned feet 55 of a reinforcing channel member 56. In Figure 17 the meeting edges of the plates 57 are bent backwardly as at 58 so that these edges form, with the plates, dihedral angles, the apices of these angles being connected by welding 59 and the portions 58 being covered by reinforcing channels 60 having feet 61 suitably secured to the bodies of the plates 57.

At the front the angles 34 have secured thereto vertical plates 62 and the front plate 33 is cut away to provide a door opening 63 as can be seen by reference to Figure 3. Between the angles 62 and the front plate 33 slide the side edges of a door member 64 which is normally urged upwardly by compression springs 65 housed in the spaces between said front plate and the plates 62 as can be well seen in Figure 7. Normally this door plate closes the opening 63, the plate being provided on the inner side with hand grips 66 and rollers 67 being provided to permit easy vertical movement of the plate 64. This construction can best be seen by reference to Figures 3, 4 and 5.

Figure 40:
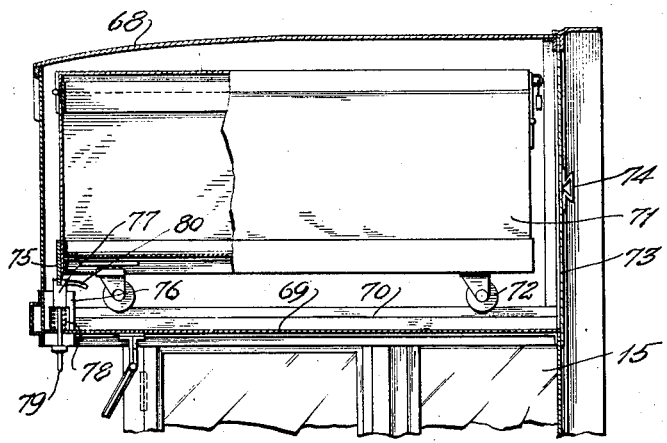
Figure 40 is a longitudinal section through the safe compartment and upper part of the cab.
Figure 41:
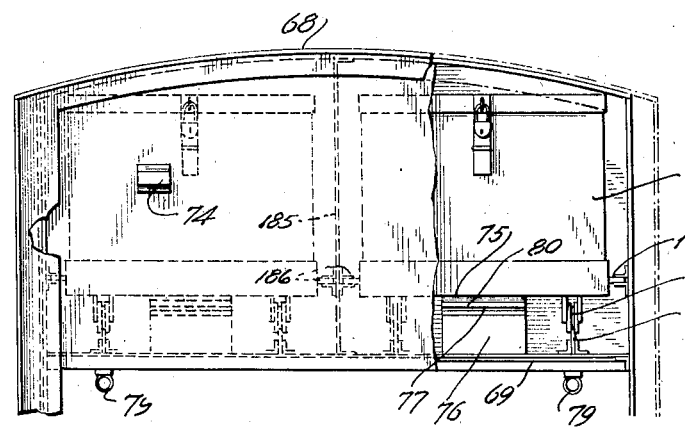
Figure 41 is an elevation, partly broken away, from the right side or rear of Figure 40.

Over the top of the cab 15 is a safe compartment 68. Referring now to Figures 40 and 41 it will be seen that this safe compartment 68 has its floor 69 provided with pairs of plate tracks 70 similar to the tracks on the chassis floor and movable into and out of this compartment are chests or receptacles 71 mounted on grooved wheels 72 which run on the track 70. The rear of this compartment registers with the door in the van body and is closed by means of a vertically sliding door 73 having handles 74 by which it may be manipulated for opening and closing movement from within said van body when the door 64 is open. Thus receptacles containing valuables may be placed in the safe compartment and are inaccessible until the van has either been emptied or removed from the chassis. In the front end of each of these receptacles there is fixed a downwardly extending latch plate 75 and in the front of the safe compartment 68 is mounted a housing 76 supporting a vertically movable latch bolt 77 normally held raised by a spring 78 and provided with an operating handle 79 below the floor of the compartment 68. At the upper end of the latch bolt 77 there is provided a cam lip 80 over which the latch plate 75 slides as the receptacle or treasure box is pushed into position so as to permit engagement of the plate 75 in the groove of the bolt 77 simply by pushing the box 71 into the compartment 68.

Mounted on the platform just to the rear of the cab is a latch housing 81 wherein slides a latch bolt 82 slotted at the top to engage the vertical flange of a latching angle 83 mounted transversely the van at the forward end thereof. This latch bolt also is provided with a cam lip 84 so as to be depressed against the action of the spring 85 upon the van being rolled into position for locking. This construction can best be seen in Figure 3 and also in that figure it will be noted that a rubber buffer plate 86 is provided to take the shock of the van striking the cab. This latch means is also shown in detail in Figures 22 to 23 and it will there be noted that the bolt is in the form of an elongated plate and that the housing is provided with rollers 87 to permit the easy sliding of this plate. Also there is mounted on the rear wall of the cab a series of guides 88 having a bolt 89 and on the bottom of the van body there is provided a plurality of keepers 90 wherein the ends of the bolt 89 are engagable when the van is fully in position. The bolt 89 has secured thereon a rack 91 wherewith meshes a pinion 92 actuated by a crank handle 93 traveling over a quadrant 94. Thus by moving this crank handle in one direction or the other the bolt is engaged with the keepers 90 or disengaged therefrom.

Referring especially to Figures 36 and 37 it will be noted that on the platform 13 at each side thereof there is provided a built-up bearing standard 95 wherein is rotatably mounted a groove roller or wheel 96 on which the vertical leg of the angle normally rests, the lower edge of the leg being received in the groove and the body being thus supported both on the rails 18 and on the rollers 96 under normal circumstances. However, there are secured to the inner faces of the vertical legs of the angles 28 certain camming blocks 97 having their lower edges arcuate in contour so that as the van body is rolled into its final position these camming blocks 97 engage the rollers 96 and slightly raise the whole body so that it does not, under these circumstances, rest on the rails 18 nor do the edges of the angles 28 engage the rollers 96. It will furthermore be noted that in these views the roller 19 is replaced by a roller 98 having a groove 99 and a lateral flange 100. Thus this roller can be used to run on plate rails 18, on ordinary T-head rails or, the periphery of the flange 100 being cylindrical, on an ordinary wooden floor.

Referring again to Figures 1 and 2 and also to Figures 5 and 36 it will be seen that there is mounted on the members 12 each side thereof, certain guard plates 101 which have their lower rear parts cut away, the lower edges of these plates being grooved as at 102 in Figure 19. Also the platform is provided with brackets 103 which support plates 104 carrying suitable channels for rollers 105 mounted on a rear wheel housing door 106, the door thus being capable of being drawn out rearwardly to expose the rear wheel when this becomes necessary. This particular form is shown in Figures 18 and 19 but it may be modified by providing for the hinging of the guard plates as in Figure 20 at 107. Also a tool box is provided accessible through a door 108. Furthermore, it will be noted by reference to Figure 36 that running along the lower side edge of each side of the van there is an angle 109 and that on each guard plate 101 is a roller 110 which rests on the horizontal flange of this angle to keep the van body from jumping up. Also lateral guide rollers 111 are provided on the van body for engaging the side plates 101.

In order to operate the latch member 82 idlers 112, see Figure 15, are provided for guiding a pull wire or cable 113 into the inside of the cab from its point of attachment to the bolt or plate 82.

Figures 42, 43:
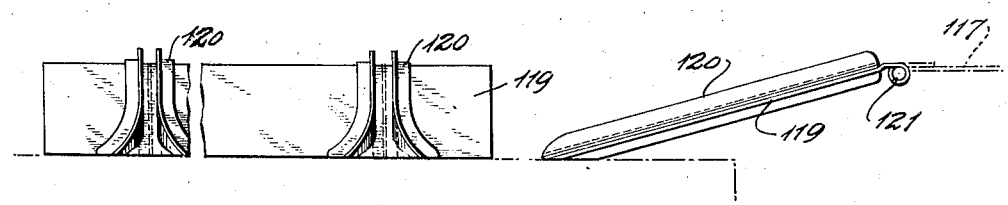
Figure 42 is a rear elevation of a bridge adapted to be used herewith upon the chassis floor and station floor being at different levels.
Figure 43 is a side elevation of the construction shown in Figure 42.

Referring now especially to Figures 11 and 12 it will be noted that on the rear of the chassis there is provided hinges 114, these hinges being preferably of the type with removable pintles and one leaf of each hinge being secured to the chassis while the other leaf is fixed to a tail board 115 which may thus be dropped to dependent position and secured by a latch 116 or be raised to horizontal position. In order to support this tail board in horizontal position there is pivoted to the rear of the chassis a pair of swinging brackets 117 which may swing from position folded up against the rear of the chassis to rearwardly projecting position and in the latter, as shown in Figure 11, be arranged to support the tail board. This tail board carries track extensions 117' so that a gap between the rear of the chassis and a loading platform 118 may be spanned thereby. Furthermore, where the loading platform is above or below the level of the platform rails a run-off bridge of the type shown in Figures 42 and 43 will be hooked in the raised tailboard 115 to incline or decline to the different level. Arrangement may be made to carry the last mentioned run-off bridge for attachment fixed to the rear of the regular tailboard. In any event this detachable run-off bridge consists of a body 119 on which are pairs of guide angles 120 flaring at their ends and the body is provided with hinge eyes 121 for attachment to the raised tailboard.

In Figure 24 there is disclosed a modified manner of securing the platform to the chassis and in this modification the longitudinal chassis beams have secured thereto vertical angles 122 carrying plates 123 having their upper edges stiffened by angles 124 and between the parts stiffened by the angles is a spacer bar 125 over which passes a U-bolt 126 the legs of which pass through a washer plate 127 and carry the nuts 128. Another form of attachment is shown in Figure 25 wherein the longitudinal channels carry vertical angles 129 between which are plates 130 which rest together and have outwardly flanged upper edges 131 reinforced by angles 132. In this form two U-bolts are used as shown at 133, these bolts having upwardly extending legs passing through angles 134 which bear against the angles 132, the bolts being provided with the usual nuts 135.

In Figure 26 there is disclosed an anti-rattling device in which it will be seen that on the side of each side plate 101 there is provided an angle 136 which engages through a slot 137 formed in a reinforcing plate 138 and also extending through the vertical leg of an angle 139 attached to the van side. A small angle 140 on the inner side of the angle 139 carries a rubber buffer 141 on which the horizontal leg of the angle 136 rests.

In Figure 27 a form of the invention is shown which has an ordinary open body 142 supported in the same manner as the van body but having outwardly turned flanged edges 143 which move between rollers 144 carried by the plates 101, the upper edges of these plates being of channel form as at 145. In this form stakes 146 are provided both for holding the load and for attachment of a tying rope, sockets 147 being carried by the body and by angle plates 148 mounted on the platform.

Figures 28, 30:
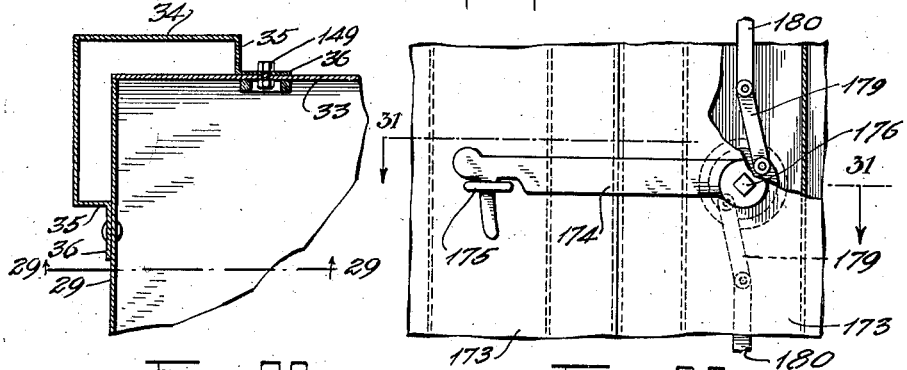
Figure 28 is a section showing a modification of the construction shown in Figure 7, for collapsible bodies.
Figure 30 is an enlarged detail elevation, partly in section, of a rear door latch used herewith.

In Figure 28 is shown an arrangement of corner brace for knock-down construction and it will be noted that this corner brace is very similar to the corner brace shown in Figure 7, being in fact the same type of brace but in this case the brace is secured to the end plate by bolts 149 so that the end plate may be released and thus the parts knocked down for laying flat on a car or truck so that several of these bodies may be transported on one chassis, this being found advantageous where the carrying is mostly or altogether in one direction.

In Figure 32 there is disclosed a modified form of supporting means for the truck body and in this form it will be noted that the rollers or wheels 20 are replaced by wheels 130

150 which are not grooved. These wheels 150 do not act to support the body while on the truck but guide angles 151 extend longitudinally of the truck for guiding these wheels. This modified form is especially useful where it is desirable to move the entire truck body laterally and other details may be seen by reference to Figures 35, 36, 38 and 39. It will be noted that in this form there is provided on the platform at each side wide rollers 152 and that over each of the longitudinal members there is also provided a roller 153, these rollers forming the supporting rollers. The body carries brackets 154 which support longitudinal angles 155 and these in turn carry longitudinal angles 156 having horizontal legs resting on the rollers 153. Likewise the lower edge angles 28 rest on the rollers 152. The brackets 157 which support the rollers 153 likewise support guide rollers 158 which engage the edges of the horizontal legs of the angles 156 and these brackets further support rollers 159 over these horizontal legs so as to prevent any jumping of the body. Referring especially to Figures 34 and 35 it will be seen that the rollers 150 are supported in swiveled brackets 160 having arms 161 which are connected by links 162, the brackets on one side of the machine being connected together while the brackets on the other side are similarly connected together. These links 162 are connected by diagonal members 163 to a pull ring 164 to a guide bolt 165, the ring and bolt moving in slots 166 formed in a frame member 167. Thus by moving the pull ring in one direction the rollers 150 may be caused to assume positions parallel to the sides of the body as in Figure 34 while movement in the opposite direction causes these rollers to assume positions transverse the body as in Figure 35. By this means these rollers can be positioned to permit forward movement of the body or lateral movement thereof on the loading platform. Furthermore, referring to Figures 38 and 39, it will be seen that the brackets 160 may be provided each with a tooth 168 engageable by a slotted head 169 on a spring pressed plunger 170 operable by a lever 171 and normally held against operation by a latch 172. Thus the rollers 150 may be maintained in their desired position against accidental movement.

Figures 29, 31:
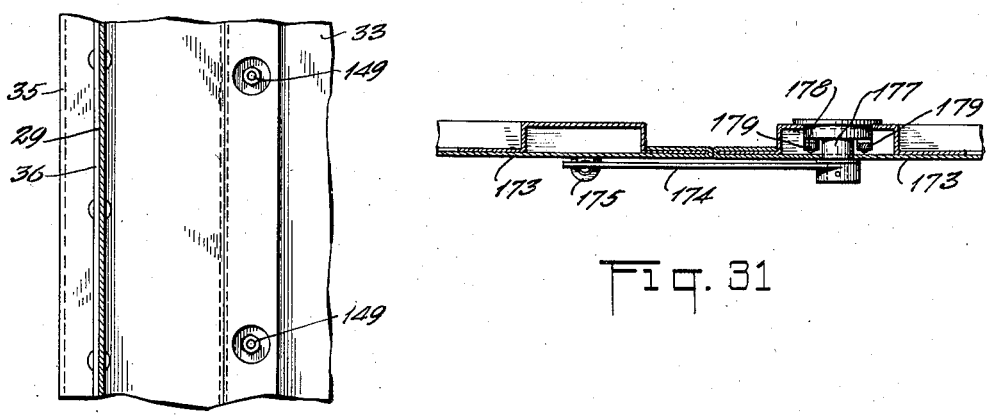
Figure 29 is a section on the line 29—29 of Figure 28.
Figure 31 is a section on the line 31—31 of Figure 30.

Referring now to Figure 33 it will be noted that the rear of the van body is closed by doors 173 hinged to the end plates and that one of these doors carries a hasp 174 while the other carries an eye 175. As shown in Figures 30 and 31 this hasp 174 is socketed as at 176 for the reception of an operating wrench and furthermore there extends from the hasp a stud 177 carrying a plate 178 to which are connected links 179 having their free ends pivoted to locking bars 180 which engage in suitable sockets at the top and bottom of the door. It will therefore be noted that operation of the hasp not only locks the door in the center but also locks this door at the top and bottom.

From an inspection of Figures 15 and 16 it will be seen that the driver's cab is provided with the usual seat 181, door 182 and door lock 183.

In Figure 32 it will be noted that the front wall 33 is built up of two plates and that accordingly there are two of the doors 64, here indicated at 64'. Also camming blocks 184 ride at the proper time on the rollers 152 to lift the body and take its weight, the rollers 159 serving to hold it when thus lifted.

It will further be noted that in the center of the compartment 68 is a plate or bar 185 and on this plate or bar as well as on the side walls of the compartment there are supported guide rollers 186.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a main frame having a bottom plate, a pair of angle bars extending up from the main frame and having juxtaposed vertical legs, one of said angle bars being spread forwardly from the other, the forward angle bar having its vertical leg projecting above the vertical leg of the rearward angle bar, a latch member slidable vertically between said vertical legs and having a notch extending transversely of the main frame along its upper edge, said latch member having a curved striker flange projecting rearwardly from its edge and overhanging the rearward angle member, spring means normally holding the latch member raised, a body movable horizontally onto and off of said main frame, and an angle member fixed to the under side of the body transversely thereof and provided with a vertical leg engaging the striker flange to depress the latch, said last vertical leg having its lower edge engaged in said notch upon movement into alinement therewith by elevation of the latch member under influence of the spring means.

2. In a device of the kind described, a main frame having a bottom plate, a pair of angle bars extending up from the main frame and having juxtaposed vertical legs, one of said angle bars being spread forwardly from the other, the forward angle bar having its vertical leg projecting above the vertical leg of the rearward angle bar, a latch member slidable vertically between said vertical legs and having a notch extending transversely of the main frame along its upper edge, said latch member having a curved striker flange projecting rearwardly from its edge and overhanging the rearward angle member, spring means normally holding the latch member raised, a body movable horizontally onto and off of said main frame, an angle member fixed to the underside of the body transversely thereof and provided with a vertical leg engaging the striker flange to depress the latch, said last vertical leg having its lower edge engaged in said notch upon movement into alinement therewith by elevation of the latch member under influence of the spring means, guide pins extending downwardly from said latch member through the bottom plate, one of said guide pins being located centrally of the length of said latch member and having an eye on its lower end, and a pull cord secured to said eye.

In testimony whereof I affix my signature.

ARON ROSMAN.